(12) United States Patent
Ogawa

(10) Patent No.: US 10,711,099 B2
(45) Date of Patent: Jul. 14, 2020

(54) OPTICAL USE POLYCARBONATE RESIN COMPOSITION METHOD FOR PRODUCING SAME, AND SPECTACLE LENS AND CAMERA LENS CONTAINING SAME

(71) Applicant: MITSUBISHI GAS CHEMICAL COMPANY, INC., Tokyo (JP)

(72) Inventor: Noriyoshi Ogawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 16/302,409

(22) PCT Filed: Apr. 7, 2017

(86) PCT No.: PCT/JP2017/014489
§ 371 (c)(1),
(2) Date: Nov. 16, 2018

(87) PCT Pub. No.: WO2017/203852
PCT Pub. Date: Nov. 30, 2017

(65) Prior Publication Data
US 2019/0276596 A1      Sep. 12, 2019

(30) Foreign Application Priority Data

May 27, 2016 (JP) .................................. 2016-105856

(51) Int. Cl.
| | | |
|---|---|---|
| C08G 64/06 | (2006.01) | |
| C08G 64/24 | (2006.01) | |
| C08G 64/30 | (2006.01) | |
| G02B 1/04 | (2006.01) | |
| C08L 69/00 | (2006.01) | |
| G02C 7/00 | (2006.01) | |

(52) U.S. Cl.
CPC ............. *C08G 64/06* (2013.01); *C08G 64/24* (2013.01); *C08G 64/307* (2013.01); *C08L 69/00* (2013.01); *G02B 1/04* (2013.01); *G02B 1/041* (2013.01); *G02C 7/00* (2013.01)

(58) Field of Classification Search
USPC ......................................... 528/204, 271, 272
See application file for complete search history.

(56) References Cited

U.S. PATENT DOCUMENTS

| | | | |
|---|---|---|---|
| 4,980,426 A | 12/1990 | Berg et al. | |
| 6,217,995 B1 * | 4/2001 | Handa | G02B 7/102 |
| | | | 264/1.24 |
| 2015/0299461 A1 | 10/2015 | Suzuki et al. | |

FOREIGN PATENT DOCUMENTS

| | | |
|---|---|---|
| JP | 60-8356 | 1/1985 |
| JP | 64-43558 | 2/1989 |
| JP | 1-318065 | 12/1989 |
| JP | 2-18501 | 1/1990 |
| JP | 10-310692 | 11/1998 |
| JP | 200-147202 | 5/2000 |
| JP | 2002-060527 | 2/2002 |
| JP | 2005-309108 | 11/2005 |
| JP | 2013-001867 | 1/2013 |
| WO | 2014/084180 | 6/2014 |

OTHER PUBLICATIONS

Extended European Search Report dated May 14, 2019 in EP application No. 17802453.5.
Seiichi Honma, "Polycarbonate resin handbook", The Nikkan Kogyo Shimbun, Ltd., Aug. 28, 1992, pp. 124 (discussed in Specification at paragraph [0008]).
Official Communication issued in International Bureau of WIPO Patent Application No. PCT/JP2017/014489, dated Jul. 4, 2017.

\* cited by examiner

*Primary Examiner* — Terressa Boykin
(74) *Attorney, Agent, or Firm* — Greenblum & Bernstein, PLC

(57) ABSTRACT

The present invention addresses the problem of providing an optical use polycarbonate resin composition which exhibits good fluidity, has a high refractive index, is inexpensive and exhibits impact resistance. This problem can be solved by an optical use polycarbonate resin composition that contains a polycarbonate resin (A) which contains a constituent unit represented by formula (1) and has an intrinsic viscosity of 0.320-0.630 dL/g, and polycarbonate resin (B) which contains a constituent unit represented by formula (2) and has an intrinsic viscosity of 0.320-0.600 dL/g, wherein the polycarbonate resin that contains a constituent unit represented by formula (2) is contained at a proportion of 45-75 mass %.

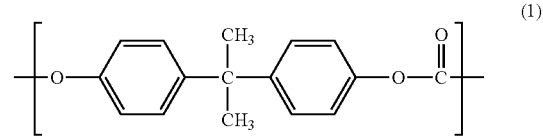

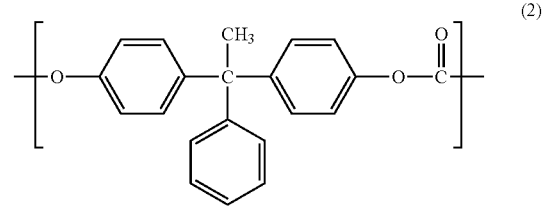

8 Claims, No Drawings

OPTICAL USE POLYCARBONATE RESIN COMPOSITION METHOD FOR PRODUCING SAME, AND SPECTACLE LENS AND CAMERA LENS CONTAINING SAME

TECHNICAL FIELD

The present invention relates to an optical polycarbonate resin composition and a method for producing the same.

BACKGROUND ART

Polycarbonate resins are excellent in transparency, impact resistance, heat resistance, dimensional stability, etc. and used in various fields as versatile engineering plastics. In particular, polycarbonate resins are often used in the optical field, taking advantage of excellent transparency thereof.

General polycarbonate resins are derived from bisphenol A (hereinafter abbreviated as BPA) and have a relatively high refractive index (nD, 1.59), and therefore are used as optical lenses, in particular, as spectacle lenses mainly in North America because of excellent impact resistance thereof (Non-Patent Document 1).

For example, in the spectacle lens industry in Japan, products having a refractive index (ne) of lower than 1.60 are regarded as middle refractive index lenses having a large thickness, and therefore, it has been desired to increase the refractive index of polycarbonate lens to 1.60 or higher and to enhance the added value thereof as a thin-type high refractive index lens.

Under such circumstances, it was found that a polycarbonate derived from 1,1-bis(4-hydroxyphenyl)-1-phenylethane (hereinafter abbreviated as BPAP) has a refractive index higher than 1.61. Meanwhile, a BPAP-type homopolycarbonate alone has low molding flowability, and for this reason, it is difficult to carry out lens molding when directly using it. For example, techniques of copolymerizing it with a bisphenol that improves molding flowability to achieve a balance between high refractive index and molding flowability are known (Patent Document 1, Patent Document 2).

However, since an expensive bisphenol is used for copolymerization in these techniques, the manufacturing cost is high, and for this reason, these techniques are not necessarily acceptable in the lens market where price reduction has been promoted. Moreover, a polycarbonate-based lens material having impact resistance in addition to high refractive index and molding flowability has been desired.

PRIOR ART DOCUMENTS

Patent Documents

Patent Document 1: Japanese Laid-Open Patent Publication No. H02-18501
Patent Document 2: Japanese Laid-Open Patent Publication No. 2005-309108

Non-Patent Documents

Non-Patent Document 1: Seiichi Honma, Ed., "Polycarbonate Resin Handbook", published by Nikkan Kogyo Shimbun, Ltd., Aug. 28, 1992, p. 124

SUMMARY OF INVENTION

Technical Problem

The problems to be solved by the present invention are to provide an optical polycarbonate resin composition having impact resistance, which may be an inexpensive lens material, a method for producing the same, and various lenses obtained by using the resin composition.

Solution to Problem

The present inventors diligently made researches in order to solve the above-described problems and found an optical polycarbonate resin composition having impact resistance, which may be an inexpensive lens material, obtained by mixing a BPAP-type homopolycarbonate having a specific intrinsic viscosity and a BPA-type homopolycarbonate having a specific intrinsic viscosity at a specific mixing ratio.

Specifically, the present invention relates to an optical polycarbonate resin composition, a method for producing the same, and a lens obtained by using the resin composition as described below.

1) An optical polycarbonate resin composition, comprising: a polycarbonate resin (A) comprising a structural unit represented by formula (1) below and having an intrinsic viscosity of 0.320 to 0.630 dL/g; and polycarbonate resin (B) comprising a structural unit represented by formula (2) below and having an intrinsic viscosity of 0.320 to 0.600 dL/g, wherein the resin composition comprises the polycarbonate resin (B) in an amount of 45 to 75% by mass.

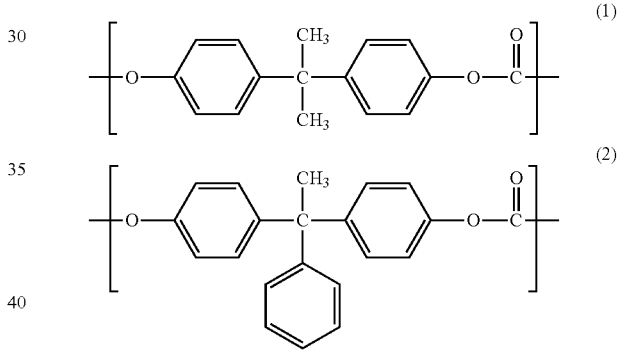

2) The optical polycarbonate resin composition according to item 1), having a refractive index (ne) of 1.600 or higher.
3) The optical polycarbonate resin composition according to item 1) or 2), having a refractive index (nd) of 1.595 or higher.
4) The optical polycarbonate resin composition according to any one of items 1) to 3), having an Abbe number (ve) of 28.0 or higher.
5) The optical polycarbonate resin composition according to any one of items 1) to 4), wherein a Q value, which is an amount of molten resin flowing out from a nozzle hole having a diameter of 1 mm and a length of 10 mm measured using a Koka flow tester at a temperature of 280° C. under a pressure of 15.69 MPa, is $2.0 \times 10^{-2}$ cm$^3$/sec or more.
6) A spectacle lens comprising the optical polycarbonate resin composition according to any one of items 1) to 5).
7) A camera lens comprising the optical polycarbonate resin composition according to any one of items 1) to 5).
8) A method for producing the optical polycarbonate resin composition according to any one of items 1) to 5), wherein a solvent is removed from a resin solution comprising the polycarbonate resin (A), the polycarbonate resin (B) and the solvent.

Advantageous Effects of Invention

The optical polycarbonate resin composition of the present invention can be an inexpensive material for lenses having impact resistance. Moreover, it can be easily processed into a spectacle lens or camera lens by means of injection molding or the like.

The optical polycarbonate resin composition of the present invention can also be utilized as a material for various lenses other than the spectacle lens and camera lens, such as an fθ lens and a Fresnel lens, and a material for optical films/sheets such as a phase difference film.

DESCRIPTION OF EMBODIMENTS

Hereinafter, one example of the embodiment of the present invention will be described, but the present invention is not limited to the below-described embodiment.

The polycarbonate resin constituting the optical polycarbonate resin composition of the present invention can be produced by a known method, for example, a direct reaction between bisphenol and phosgene (phosgene method) or a transesterification reaction between bisphenol and bisaryl carbonate (transesterification method). Specifically, BPA, which derives the polycarbonate resin (A) comprising the structural unit represented by structural formula (1), and BPAP, which derives the polycarbonate resin (B) comprising the structural unit represented by structural formula (2), are respectively reacted with a carbonate-forming compound in the production.

Examples of the carbonate-forming compound include phosgene, and bisallyl carbonates such as diphenyl carbonate, di-p-tolyl carbonate, phenyl-p-tolyl carbonate, di-p-chlorophenyl carbonate and dinaphthyl carbonate. Two or more of these compounds may be used in combination. From the viewpoint of the distributability, price, purity, etc., phosgene or diphenyl carbonate is preferably used.

In the phosgene method, usually, BPA and BPAP are respectively reacted with phosgene in the presence of an acid binding agent and a solvent. As the acid binding agent, for example, pyridine, a hydroxide of an alkali metal such as sodium hydroxide and potassium hydroxide or the like is used. As the solvent, for example, methylene chloride, chloroform or the like is used. Moreover, for promoting a polycondensation reaction, a catalyst such as a tertiary amine including triethylamine or a quaternary ammonium salt is preferably added, and for adjusting the polymerization degree, a monofunctional compound such as phenol, p-t-butylphenol, p-cumylphenol and long chain alkyl substituted phenol is preferably added. Further, if desired, an antioxidant such as sodium sulfite and hydrosulfite and a branching agent such as phloroglucin and isatin bisphenol may be added in a small amount. The reaction temperature is usually 0 to 150° C., and preferably 5 to 40° C. The reaction time varies depending on the reaction temperature, but is usually 0.5 min to 10 hours, and preferably 1 min to 2 hours. Further, during the reaction, pH of the reaction system is desirably maintained at 10 or higher.

In the transesterification method, BPA and BPAP are respectively mixed with bisaryl carbonate and reacted at a high temperature under reduced pressure. The reaction is performed usually at 150 to 350° C., and preferably at 200 to 300° C. Further, the pressure is preferably reduced to 133 Pa or lower by the end of the reaction, and phenols derived from the bisaryl carbonate produced by means of the transesterification reaction are distilled away to the outside of the system. The reaction time varies depending on the reaction temperature, the degree of reducing pressure, etc., but is usually about 1 to 24 hours. The reaction is preferably performed under an atmosphere of an inert gas such as nitrogen and argon. Further, if desired, the reaction may be performed with a molecular weight control agent, an antioxidant and a branching agent being added.

In the polycarbonate resin of the present invention, the intrinsic viscosity of the polycarbonate resin (A) comprising the structural unit represented by structural formula (1) is 0.320 to 0.630 dL/g, and preferably 0.330 to 0.560 dL/g. When the intrinsic viscosity is within the above-described range, flowability and mechanical strength required for lens molding can be retained.

In the polycarbonate resin of the present invention, the intrinsic viscosity of the polycarbonate resin (B) comprising the structural unit represented by structural formula (2) is 0.320 to 0.600 dL/g, and preferably 0.350 to 0.590 dL/g. When the intrinsic viscosity is within the above-described range, flowability and mechanical strength required for lens molding can be retained.

In the optical polycarbonate resin composition of the present invention, the ratio of the polycarbonate resin (B) is 45 to 75% by mass, preferably 46 to 63% by mass, and more preferably 50 to 63% by mass. When the ratio is within the above-described range, a molded body obtained by injection molding of an optical polycarbonate resin composition having a refractive index (ne) at the e-line (546.1 nm) of preferably 1.600 or higher, i.e., the optical polycarbonate resin composition of the present invention can retain optical physical properties including a refractive index (ne (sometimes referred to as ne-line)) of preferably 1.600 or higher, and more preferably 1.601 to 1.608, and an Abbe number of preferably 28.0 or higher, and more preferably 28.3 to 29.2. When the refractive index (ne) is lower than 1.600, the added value as lenses is low, and when the Abbe number is lower than 28.0, chromatic aberration tends to be felt in the case of lenses for severe myopia or hyperopia.

Moreover, from a practical viewpoint, it is preferred that a molded body obtained by injection molding of an optical polycarbonate resin composition having a refractive index (nd) at the d-line (587.6 nm) of preferably 1.595 or higher, i.e., the optical polycarbonate resin composition of the present invention has a refractive index (nd (sometimes referred to as nd-line)) of 1.595 or higher, and preferably 1.596 to 1.604.

Further, in the optical polycarbonate resin composition of the present invention, the ratio of the polycarbonate resin (A) and the polycarbonate resin (B) is preferably 90% by mass or more, more preferably 95% by mass or more, and even more preferably 99% by mass or more.

In this regard, the refractive index represents a value obtained by rounding off to the third decimal place, and the Abbe number represents a value obtained by rounding off to the first decimal place.

Regarding molding flowability of the optical polycarbonate resin composition of the present invention, a Q value as a flowability index, which is measured using a Koka flow tester at 280° C. under 15.69 MPa with an orifice having a diameter of 1 mm and a length of 10 mm, is preferably $2.0 \times 10^{-2}$ cm$^3$/sec or more, and more preferably $2.0 \times 10^{-2}$ to $11.1 \times 10^{-2}$ cm$^3$/sec. When the Q value is $2.0 \times 10^{-2}$ cm$^3$/sec or more, molding flowability required for lens molding can be obtained.

As methods for producing the optical polycarbonate resin composition of the present invention, there are a method of mixing the polycarbonate resin (A) and the polycarbonate resin (B) in the solid state and a method of mixing the polycarbonate resin (A) and the polycarbonate resin (B) in the solution state. In the foamier method, the polycarbonate resin (A) and the polycarbonate resin (B) in the form of powder or pellet are mixed together using a mechanical blender or the like, and then a single screw extruder or twin screw extruder is used to obtain a pellet-like resin composition. It is easy to perform mixing, but when extrusion is performed once, mixing may be insufficient and a cloudy pellet may be obtained. In this case, it is necessary to perform blending/extrusion twice or more until the pellet becomes transparent. Further, for promoting mixing, a screw having improved mixing performance, such as a Dulmage screw and a screw having a kneading disk segment, may be used.

The latter method is a method in which the polycarbonate resin (A) and the polycarbonate resin (B) are dissolved in a solvent to be mixed together. Specifically, a resin solution comprising the polycarbonate resin (A) and the polycarbonate resin (B) is mixed in the solution state, and then the solvent is removed, thereby obtaining a powder or pellet-like resin composition.

When the former method is compared to the latter method, the method of mixing a resin solution is more preferred because it is easy to perform homogeneous mixing and higher transparency can be obtained.

Moreover, in the method of dissolving the polycarbonate resin (A) and the polycarbonate resin (B) in a solvent to be mixed together, the polycarbonate resin (A) and the polycarbonate resin (B) may be respectively dissolved in different solvents, followed by mixing the resin solutions, or the polycarbonate resin (A) and the polycarbonate resin (B) may also be dissolved in the same solvent, followed by mixing. It is preferred to dissolve the polycarbonate resin (A) and the polycarbonate resin (B) respectively in different solvents, followed by mixing the resin solutions, because the mixing ratio between the polycarbonate resin (A) and the polycarbonate resin (B) can be easily and suitably adjusted.

Examples of the solvent to be used when mixing the optical polycarbonate resin composition of the present invention in the solution state include: halogen-based organic solvents such as dichloromethane, chloroform, 1,2-dichloroethylene, tetrachloroethane and chlorobenzene; and non-halogen-based organic solvents such as aromatic hydrocarbons including toluene and xylene, cyclic ketones including cyclohexanone, cyclopentanone and isophorone, cyclic ethers including tetrahydrofuran and dioxane, dimethylformamide, and dimethyl sulfoxide. These solvents may be used solely, or two or more of them may be used as a mixed solvent. Moreover, various additives such as an antioxidant and an ultraviolet absorber can be simultaneously mixed therewith.

If desired, a mold release agent required for lens molding, an antioxidant for suppressing coloring at the time of molding, an antioxidant and ultraviolet absorber for suppressing environmental degradation after molding, and a blueing agent and various stain pigments for changing color tone are preferably added to the optical polycarbonate resin composition of the present invention. In addition, various physical property-improving agents such as a flow modifier and an impact resistance-improving agent may be added within a range in which characteristics of the optical polycarbonate resin composition are retained.

The lens obtained from the optical polycarbonate resin composition of the present invention has impact resistance approximately equivalent to those of conventional polycarbonates. At least impact resistance, wherein the lens is not broken in the Izod impact test (without notch) in conformity with ASTM D256, is retained.

The optical polycarbonate resin composition of the present invention can be processed into a lens by a publicly-known molding method such as wet molding, compression molding, extrusion molding and injection molding. In particular, it is suitable for injection molding like conventional polycarbonate lenses. The lens can be polished and cut by a known method, and can be applied to a spectacle lens having high design property, a camera lens, etc.

EXAMPLES

Hereinafter, the present invention will be specifically described based on working examples and comparative examples, but the present invention is not limited to the working examples.

<Method for Measuring Refractive Index and Abbe Number>

Using an Abbe refractometer manufactured by Atago Co., Ltd., the refractive index (ne) at the e-line (546.1 nm) and the refractive index (nd) at the d-line (587.6 nm) of a test piece (9×3×6 mm) cut from an injection-molded product for the Izod impact test in conformity with ASTM D256 were measured at 20° C. Further, the refractive index (nF') at the F'-line (488 nm) and the refractive index (nC') at the C'-line (643.9 nm) were measured, and the Abbe number (ve) was calculated according to formula (3) below.

$$\text{Abbe number } (ve)=(ne-1)/(nF'-nC') \qquad \text{formula (3)}$$

<Method for Measuring Flowability (Q Value)>

The amount of molten resin flowing out from a nozzle hole (orifice) having a diameter of 1 mm and a length of 10 mm (unit: ×10$^{-2}$ cm$^3$/sec) was measured using a Koka flow tester (manufactured by Shimadzu Corporation) at a temperature of 280° C. under a pressure of 15.69 MPa.

<Method for Measuring Intrinsic Viscosity>

The intrinsic viscosity was obtained by using 0.5% (mass/volume) dichloromethane solution of the polycarbonate resin at 20° C. with a Huggins constant of 0.45, using an Ubbelohde viscosity tube.

<Injection Molding Test>

Using a small injection molding machine (C. Mobile manufactured by Shinko Sellbic Co., Ltd.), an Izod impact test piece in conformity with ASTM D256 (63.5×3.0×12.7 mm, without notch) and a circular test piece having a diameter of 28 mm and a thickness of 3 mm were injection-molded under conditions of injection pressure: 283 MPa, injection speed: 20 mm/sec, resin temperature: 320° C. and mold temperature: 100° C.

<Total Light Transmittance>

The total light transmittance of an injection-molded product having a thickness of 3 mm was measured in conformity with JIS K7136 using a Haze meter manufactured by Nippon Denshoku Industries Co., Ltd.

<Izod Impact Test>

An Izod test piece (without notch) was subjected to an impact test with a 2J hammer at 25° C. in conformity with ASTM D256 using an impact test machine manufactured by Toyo Seiki Co., Ltd.

Synthesis Example 1

34 L of 8.0% (mass/mass) aqueous solution of sodium hydroxide was put into a 100 L reaction container, and 5.8 kg of BPAP (manufactured by Honshu Chemical Industry Co., Ltd., 20 mol) and 10 g of hydrosulfite were added thereto to be dissolved therein. 22 L of dichloromethane was added thereto, and the mixture was stirred with the temperature being kept at 15° C. while 2.6 kg of phosgene was injected thereinto over 30 minutes.

After the injection was finished, the mixture was vigorously stirred for 1 minute to emulsify the reaction solution. 100 g of p-tert-butylphenol (hereinafter abbreviated as PTBP, 0.67 mol) was added thereto, and the mixture was further stirred for 10 minutes. After that, 20 ml of triethylamine was added thereto, and the mixture was further stirred for 50 minutes to perform polymerization.

The polymerization solution was separated into an aqueous phase and an organic phase, and the organic phase was neutralized with phosphoric acid and repeatedly washed with water until the conductivity of the washing solution became 10 μS/cm or less, thereby obtaining a purified polymer resin solution. The obtained resin solution was diluted with dichloromethane to adjust its concentration to 10.0% (mass/mass). 5 kg of the obtained resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder.

The intrinsic viscosity of the obtained resin (AP-PC) was 0.423 dL/g.

Synthesis Example 2

Polymerization and purification were carried out in manners similar to those in Synthesis Example 1, except that the amount of PTBP was changed to 140 g (0.93 mol). The intrinsic viscosity of the obtained resin (AP-PC) was 0.355 dL/g. The obtained resin solution was diluted with dichloromethane to adjust its concentration to 10% (mass/mass).

Synthesis Example 3

Polymerization and purification were carried out in manners similar to those in Synthesis Example 1, except that the amount of PTBP was changed to 64 g (0.43 mol). The intrinsic viscosity of the obtained resin (AP-PC) was 0.581 dL/g. The obtained resin solution was diluted with dichloromethane to adjust its concentration to 10% (mass/mass). 5 kg of the obtained resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder.

Synthesis Example 4

Polymerization and purification were carried out in manners similar to those in Synthesis Example 1, except that the amount of PTBP was changed to 260 g (1.73 mol). The intrinsic viscosity of the obtained resin (AP-PC) was 0.254 dL/g. The obtained resin solution was diluted with dichloromethane to adjust its concentration to 10% (mass/mass).

Synthesis Example 5

Polymerization and purification were carried out in manners similar to those in Synthesis Example 1, except that the amount of PTBP was changed to 60 g (0.40 mol). The intrinsic viscosity of the obtained resin (AP-PC) was 0.619 dL/g. The obtained resin solution was diluted with dichloromethane to adjust its concentration to 10% (mass/mass).

Synthesis Example 6

Polymerization and purification were carried out in manners similar to those in Synthesis Example 1, except that BPAP was changed to BPA in an amount of 4.56 kg (manufactured by Nippon Steel & Sumikin Chemical Co., Ltd., 20 mol) and that the amount of PTBP was changed to 124 g (0.83 mol). The intrinsic viscosity of the obtained resin (BPA-PC) was 0.444 dL/g. The obtained resin solution was diluted with dichloromethane to adjust its concentration to 10% (mass/mass). 5 kg of the obtained resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder.

Synthesis Example 7

Polymerization and purification were carried out in manners similar to those in Synthesis Example 1, except that BPAP was changed to BPA in an amount of 4.56 kg (manufactured by Nippon Steel & Sumikin Chemical Co., Ltd., 20 mol) and that the amount of PTBP was changed to 187 g (1.25 mol). The intrinsic viscosity of the obtained resin (BPA-PC) was 0.339 dL/g. The obtained resin solution was diluted with dichloromethane to adjust its concentration to 10% (mass/mass). 5 kg of the obtained resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder.

Synthesis Example 8

Polymerization and purification were carried out in manners similar to those in Synthesis Example 1, except that BPAP was changed to BPA in an amount of 4.56 kg (manufactured by Nippon Steel & Sumikin Chemical Co., Ltd., 20 mol) and that the amount of PTBP was changed to 90 g (0.6 mol). The intrinsic viscosity of the obtained resin (BPA-PC) was 0.554 dL/g. The obtained resin solution was diluted with dichloromethane to adjust its concentration to 10% (mass/mass).

Synthesis Example 9

Polymerization and purification were carried out in manners similar to those in Synthesis Example 1, except that BPAP was changed to BPA in an amount of 4.56 kg (manufactured by Nippon Steel & Sumikin Chemical Co., Ltd., 20 mol) and that the amount of PTBP was changed to 333 g (2.22 mol). The intrinsic viscosity of the obtained resin (BPA-PC) was 0.247 dL/g. The obtained resin solution was diluted with dichloromethane to adjust its concentration to 10% (mass/mass).

Synthesis Example 10

Polymerization and purification were carried out in manners similar to those in Synthesis Example 1, except that BPAP was changed to BPA in an amount of 4.56 kg (manufactured by Nippon Steel & Sumikin Chemical Co., Ltd., 20 mol) and that the amount of PTBP was changed to 90 g (0.44 mol). The intrinsic viscosity of the obtained resin (BPA-PC) was 0.653 dL/g. The obtained resin solution was diluted with dichloromethane to adjust its concentration to 10% (mass/mass).

Working Example 1

5.35 kg of the BPA-PC resin solution of Synthesis Example 6 and 4.65 kg of the AP-PC resin solution of Synthesis Example 1 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder.

To the obtained powder, 0.05% by mass of stearic acid monoglyceride as a mold release agent (manufactured by Riken Vitamin Co., Ltd., brand name: S-100A), 0.15% by mass of a benzotriazole-based ultraviolet absorber (manufactured by ADEKA Corporation, brand name: LA-31), 0.03% by mass of a phosphite-based antioxidant (manufactured by ADEKA Corporation, brand name: ADK STAB PEP-36) and 0.0001% by mass of an anthraquinone-based blue dye (manufactured by LANXESS K.K., brand name: Macrolex Blue RR) were added, and it was mixed together using a blender.

The obtained resin composition was extruded at 300° C. using a 20 mm single screw extruder with a vent (L/D 34.5, full flight screw), thereby obtaining a pellet. The obtained pellet was injection-molded at 320° C. using a small injection molding machine to obtain a circular injection-molded product having a diameter of 28 mm and a thickness of 3 mm and an Izod impact piece in conformity with ASTM (63.5× 3.0×12.7 mm). Using the obtained pellet and injection-molded product, the Q value, total light transmittance, refractive index, Abbe number and Izod impact value were measured.

Working Example 2

3.70 kg of the BPA-PC resin solution of Synthesis Example 7 and 6.30 kg of the AP-PC resin solution of Synthesis Example 1 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Working Example 3

5.50 kg of the BPA-PC resin solution of Synthesis Example 8 and 4.50 kg of the AP-PC resin solution of Synthesis Example 2 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Working Example 4

3.88 kg of the BPA-PC resin solution of Synthesis Example 7 and 6.12 kg of the AP-PC resin solution of Synthesis Example 1 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Working Example 5

5.00 kg of the BPA-PC resin solution of Synthesis Example 6 and 5.00 kg of the AP-PC resin solution of Synthesis Example 2 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Working Example 6

4.50 kg of the BPA-PC resin solution of Synthesis Example 7 and 5.50 kg of the AP-PC resin solution of Synthesis Example 2 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Working Example 7

2.50 kg of the BPA-PC resin solution of Synthesis Example 7 and 7.50 kg of the AP-PC resin solution of Synthesis Example 1 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Working Example 8

275 g of the BPA-PC resin powder of Synthesis Example 7 and 225 g of the AP-PC resin powder of Synthesis Example 3 were put into a blender, additives were added thereto in a manner similar to that in Example 1, and mixing and extrusion were carried out. Since a part of the extruded pellet was cloudy, the obtained pellet was mixed using a blender and then extrusion was carried out again. After that, injection molding and analyses were carried out.

Comparative Example 1

The BPA-PC resin powder of Synthesis Example 6 was fed into a blender, additives were blended therein in a manner similar to that in Example 1, and extrusion, injection molding and analyses were carried out.

Comparative Example 2

The AP-PC resin powder of Synthesis Example 1 was fed into a blender, additives were blended therein in a manner similar to that in Example 1, and extrusion and injection molding were carried out. However, the resin clogged a portion near the gate, and it was impossible to obtain a test piece that can be used in the tests.

Comparative Example 3

2.00 kg of the BPA-PC resin solution of Synthesis Example 7 and 8.00 kg of the AP-PC resin solution of Synthesis Example 1 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion and injection molding were carried out. However, only an injection-molded product with filling insufficiency was obtained. A test piece for the measurement of the refractive index was successfully obtained, but it was impossible to carry out the total light transmittance measurement and the Izod impact test.

Comparative Example 4

6.00 kg of the BPA-PC resin solution of Synthesis Example 7 and 4.00 kg of the AP-PC resin solution of Synthesis Example 1 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Comparative Example 5

5.00 kg of the BPA-PC resin solution of Synthesis Example 7 and 5.00 kg of the AP-PC resin solution of Synthesis Example 4 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out.

Comparative Example 6

5.00 kg of the BPA-PC resin solution of Synthesis Example 9 and 5.00 kg of the AP-PC resin solution of Synthesis Example 4 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion, injection molding and analyses were carried out. However, since the strength was low and an injection-molded product was broken when removed from a mold, though a test piece for the measurement of the refractive index was successfully obtained, it was impossible to carry out the total light transmittance measurement and the Izod impact test.

Comparative Example 7

5.00 kg of the BPA-PC resin solution of Synthesis Example 10 and 5.00 kg of the AP-PC resin solution of Synthesis Example 5 were put into a 20 L container, and it was homogeneously mixed using a stirring machine. The obtained mixed resin solution was added dropwise to warm water with its temperature being kept at 45° C., and the solvent was evaporated and removed, thereby obtaining a white powdery precipitate. The obtained precipitate was filtered and dried at 120° C. for 24 hours, thereby obtaining a polymer powder. In the obtained powder, additives were blended in a manner similar to that in Example 1, and extrusion and injection molding were carried out. However, the extruded pellet was significantly colored, and regarding injection molding, the resin did not flow and caused blocking at the time of injection, and molding was unsuccessful.

TABLE 1

| Working Examples and Comparative Examples | BPA-PC % by mass | Intrinsic viscosity dL/g | AP-PC % by mass | Intrinsic viscosity dL/g | Q value ×10$^{-2}$ cm$^3$/sec | Total light transmittance % | Refractive index ηe | nd | Abbe number νe | Izod impact test without notch |
|---|---|---|---|---|---|---|---|---|---|---|
| Working Example 1 | 53.5 | 0.444 | 46.5 | 0.423 | 3.5 | 89.9 | 1.600 | 1.596 | 29.1 | not broken |
| Working Example 2 | 37.0 | 0.339 | 63.0 | 0.423 | 4.8 | 89.6 | 1.605 | 1.600 | 28.7 | not broken |
| Working Example 3 | 55.0 | 0.554 | 45.0 | 0.355 | 2.4 | 90.0 | 1.600 | 1.595 | 29.1 | not broken |
| Working Example 4 | 38.8 | 0.339 | 61.2 | 0.423 | 5.2 | 89.6 | 1.604 | 1.600 | 28.7 | not broken |
| Working Example 5 | 50.0 | 0.444 | 50.0 | 0.355 | 4.8 | 89.9 | 1.601 | 1.597 | 29.0 | not broken |

TABLE 1-continued

| Working Examples and Comparative Examples | BPA-PC % by mass | Intrinsic viscosity dL/g | AP-PC % by mass | Intrinsic viscosity dL/g | Q value ×10⁻² cm³/sec | Total light transmittance % | Refractive index ηe | nd | Abbe number ve | Izod impact test without notch |
|---|---|---|---|---|---|---|---|---|---|---|
| Working Example 6 | 45.0 | 0.339 | 55.0 | 0.355 | 11.1 | 89.8 | 1.602 | 1.598 | 28.8 | not broken |
| Working Example 7 | 25.0 | 0.339 | 75.0 | 0.423 | 2.2 | 89.6 | 1.608 | 1.603 | 28.4 | not broken |
| Working Example 8 | 55.0 | 0.339 | 45.0 | 0.581 | 2.0 | 89.5 | 1.600 | 1.595 | 29.1 | not broken |
| Comparative Example 1 | 100 | 0.444 | 0 | — | 7.4 | 90.4 | 1.587 | 1.583 | 30.2 | not broken |
| Comparative Example 2 | 0 | — | 100 | 0.423 | 0.3 | unmeasurable | unmeasurable | unmeasurable | unmeasurable | unmeasurable |
| Comparative Example 3 | 20 | 0.339 | 80 | 0.423 | 1.5 | unmeasurable | 1.609 | 1.605 | 28.2 | unmeasurable |
| Comparative Example 4 | 60 | 0.339 | 40 | 0.423 | 11.7 | 90.0 | 1.598 | 1.594 | 29.2 | not broken |
| Comparative Example 5 | 50 | 0.339 | 50 | 0.254 | 33.1 | 89.9 | 1.601 | 1.597 | 29.0 | broken |
| Comparative Example 6 | 50 | 0.247 | 50 | 0.254 | 75.9 | unmeasurable | 1.601 | 1.597 | 29.1 | unmeasurable |
| Comparative Example 7 | 50 | 0.653 | 50 | 0.619 | unmeasurable | unmeasurable | unmeasurable | unmeasurable | unmeasurable | unmeasurable |

INDUSTRIAL APPLICABILITY

The optical polycarbonate resin composition of the present invention can also be utilized as a material for various lenses other than the spectacle lens and camera lens, such as an fθ lens and a Fresnel lens, and a material for optical films/sheets such as a phase difference film. In particular, the resin composition can be applied to sports glasses, protective glasses and lenses for vehicles, taking advantage of impact resistance. Moreover, the resin composition has excellent characteristics as flint lenses since it has a relatively low Abbe number, and therefore it is also suitable for constituent lenses for compact cameras and cameras for portable terminals.

The invention claimed is:

1. An optical polycarbonate resin composition, comprising: a polycarbonate resin (A) comprising a structural unit represented by formula (1) below and having an intrinsic viscosity of 0.320 to 0.630 dL/g; and polycarbonate resin (B) comprising a structural unit represented by formula (2) below and having an intrinsic viscosity of 0.423 to 0.600 dL/g, wherein the resin composition comprises the polycarbonate resin (B) in an amount of 45 to 75% by mass 2. The optical polycarbonate resin composition according to claim 1, having a refractive index (ne) of 1.600 or higher.

3. The optical polycarbonate resin composition according to claim 1, having a refractive index (nd) of 1.595 or higher.

4. The optical polycarbonate resin composition according to claim 1, having an Abbe number (ve) of 28.0 or higher.

5. The optical polycarbonate resin composition according to claim 1, wherein a Q value, which is an amount of molten resin flowing out from a nozzle hole having a diameter of 1 mm and a length of 10 mm measured using a Koka flow tester at a temperature of 280° C. under a pressure of 15.69 MPa, is 2.0×10⁻² cm³/sec or more.

6. A spectacle lens comprising the optical polycarbonate resin composition according to claim 1.

7. A camera lens comprising the optical polycarbonate resin composition according to claim 1.

8. A method for producing an optical polycarbonate resin composition comprising a polycarbonate resin (A) comprising a structural unit represented by formula (1) below and having an intrinsic viscosity of 0.320 to 0.630 dL/g; and polycarbonate resin (B) comprising a structural unit represented by formula (2) below and having an intrinsic viscosity of 0.320 to 0.600 dL/g, and the resin composition comprises the polycarbonate resin (B) in an amount of 45 to 75% by mass,

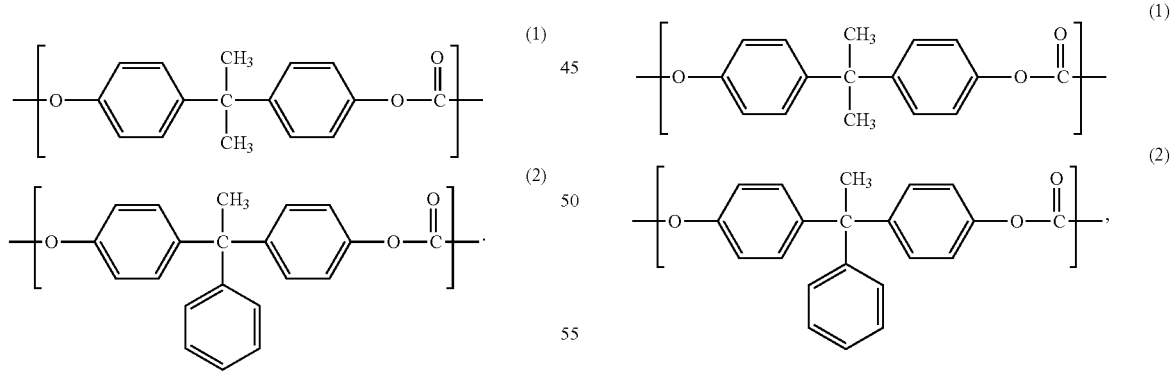

wherein a solvent is removed from a resin solution comprising the polycarbonate resin (A), the polycarbonate resin (B), and the solvent.

* * * * *